(12) United States Patent
Ines et al.

(10) Patent No.: US 8,512,164 B2
(45) Date of Patent: Aug. 20, 2013

(54) GOLF CLUB HEAD

(71) Applicant: Taylor Made Golf Company, Inc., Carlsbad, CA (US)

(72) Inventors: Marni D. Ines, San Marcos, CA (US); Bret H. Wahl, Escondido, CA (US)

(73) Assignee: Taylor Made Golf Company Inc., Carlsbad, CA (US)

( * ) Notice: Subject to any disclaimer, the term of this patent is extended or adjusted under 35 U.S.C. 154(b) by 0 days.

(21) Appl. No.: 13/741,286

(22) Filed: Jan. 14, 2013

(65) Prior Publication Data
US 2013/0125366 A1    May 23, 2013

Related U.S. Application Data

(62) Division of application No. 12/763,014, filed on Apr. 19, 2010, now Pat. No. 8,353,785.

(60) Provisional application No. 61/214,487, filed on Apr. 23, 2009.

(51) Int. Cl.
*A63B 53/04* (2006.01)

(52) U.S. Cl.
USPC ........................................... 473/342

(58) Field of Classification Search
USPC ........................................... 473/342
See application file for complete search history.

(56) References Cited

U.S. PATENT DOCUMENTS

| 5,344,140 | A | | 9/1994 | Anderson |
| 5,984,339 | A | * | 11/1999 | Guild ............................. 280/402 |
| 5,984,399 | A | | 11/1999 | Viertel et al. |
| 6,989,506 | B2 | * | 1/2006 | Yabu ......................... 219/121.64 |
| 7,018,305 | B2 | | 3/2006 | Sugimoto |
| 2008/0015048 | A1 | | 1/2008 | Gilbert et al. |
| 2009/0239681 | A1 | * | 9/2009 | Sugimoto ..................... 473/350 |

OTHER PUBLICATIONS

Shoponline wholesaler.com, <http://www.shoponlinewholesaler.com/393_TaylorMade-R7-CGB-MAX-Iron-Set.html>, 5 pages (accessed Aug. 16, 2010).
Photos (2) of PRGR Golf, Forged GN 502 (date unknown).
Photos (2) of MACTEC, NV3 (date unknown).
Photos (2) of Wilson Staff, Nc6 multi Compo (date unknown).
Photos (2) of Katana Golf, Sword 808 forged (date unknown).
Photos (2) of Orlimar, Trimetal, alpha maraging (date unknown).

* cited by examiner

*Primary Examiner* — Michael Dennis
(74) *Attorney, Agent, or Firm* — Klarquist Sparkman, LLP (57) ABSTRACT

An iron-type golf club head is disclosed having a first piece including a portion of an iron-type face. A second piece including a heel portion, a sole portion, a toe portion, a topline portion, a hinge region, and a front opening for receiving the first piece is also disclosed. A first contact surface of the first piece is connected with a second contact surface of the second piece at a contact interface. A continuous weld extends along the contact interface attaching the first and second pieces together at the contact interface. The continuous weld includes a fusion zone occurring substantially on the iron-type face outside the hinge region of the club head.

14 Claims, 10 Drawing Sheets

GOLF CLUB HEAD

CROSS REFERENCE TO RELATED APPLICATION

This application is a divisional of U.S. patent application Ser. No. 12/763,014, filed Apr. 19, 2010, which claims the benefit of U.S. Provisional Patent Application No. 61/214,487, filed Apr. 23, 2009, both of which are incorporated herein by reference.

FIELD

The present disclosure relates to a golf club head. More specifically, the present disclosure relates to a golf club head made of multiple pieces that are welded together.

BACKGROUND

A golf set includes various types of clubs for use in different conditions or circumstances in which a ball is hit during a golf game. A set of clubs typically includes a "driver" for hitting the ball the longest distance on a course. A fairway "wood" can be sued for hitting the ball shorter distances than the driver. A set of irons are used for hitting the ball within a range of distances typically shorter than the driver or woods.

An iron has a flat face that normally contacts the ball whenever the ball is being hit with the iron. Irons have angled faces for achieving lofts ranging from about 18 degrees to about 60 degrees.

Every club has a "sweet spot" that represents the best hitting zone on the face for maximizing the probability of the golfer achieving the best and most predictable shot using the particular club. Most golfers strive to make contact with the ball inside the sweet spot to achieve a desired trajectory.

In order to withstand repeated ball impacts, the face plate of a golf club has traditionally been made thick enough to prevent mechanical failure.

SUMMARY OF THE DESCRIPTION

The present disclosure describes a golf club head comprising a heel portion, a toe portion, a crown, a sole, and a face.

The foregoing and other objects, features, and advantages of the invention will become more apparent from the following detailed description, which proceeds with reference to the accompanying figures.

According to one aspect of the present invention, an iron-type golf club head is described having a first piece including at least a portion of an iron-type face. A second piece including a heel portion, a sole portion, a toe portion, a top-line portion, a hinge region, and a front opening for receiving the first piece is also described. A first contact surface of the first piece is connected with a second contact surface of the second piece at a contact interface. A continuous weld extends along the contact interface attaching the first and second pieces together at the contact interface. The continuous weld includes a fusion zone occurring substantially on the iron-type face outside the hinge region of the club head.

In one example, a rear weld bead is exposed on a rear surface of the iron-type face.

In another example, the rear weld bead is substantially covered by a third piece.

In yet another example, a front weld bead is removed from a front surface of the iron-type face and a weld centerline axis is offset from a rear wall portion by a distance of at least 1 mm.

In one example, a total face area is about 2,700 $mm^2$-5,000 $mm^2$ and a thin face area is about 450 $mm^2$-2,020 $mm^2$.

In another example, a thin face thickness is about 1.5-2.5 mm or a thin face thickness is in a range of less than 2.0 mm.

In yet another example, a thin face area percentage is about 13-70% and an inverted cone region is about 230 $mm^2$ to about 2,000 $mm^2$.

In one example, a first piece rear surface area is about 300 $mm^2$ to about 4,000 $mm^2$ and a coefficient of restitution is greater than about 0.8.

In another example, the first piece is forged of a steel selected from the group consisting of maraging steels, maraging stainless steels, and PH stainless steels. The stainless steel is C455 or 17-4 stainless steel.

In yet another example, the fusion zone is substantially located in a relatively low impact stress region of the front striking surface.

According to another aspect of the present invention, a golf club head is described having a front striking surface, a rear face surface located behind at least a portion of the front striking surface in a cavity region, a first piece including at least a portion of the front striking surface, and a second piece including a heel portion, a sole portion, a toe portion, a top-line portion, a hinge region, and a front opening on the front striking surface for receiving the first piece. A first contact surface of the first piece is connected with a second contact surface of the second piece at a contact interface. A continuous weld extends along the contact interface attaching the first and second pieces together at the contact interface. The continuous weld includes a fusion zone creating a weld bead on at least the rear face surface. A third piece is configured to be inserted into the cavity region and attached to the rear face surface. The third piece substantially covers the weld bead on the rear face surface.

According to another aspect of the present invention, a method is described including placing a continuous weld located on the face of a cavity back iron-type golf club head. The weld extends continuously on a front striking surface of the face creating a front and rear weld bead. The weld is located at least partially on a contact interface between a first piece and a second piece. A method of removing a front weld bead from the front striking surface of the face and covering the rear weld bead located on a rear surface of the face with a badge is described. The rear weld bead is obscured by the badge in the cavity back iron-type golf club head.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1A:
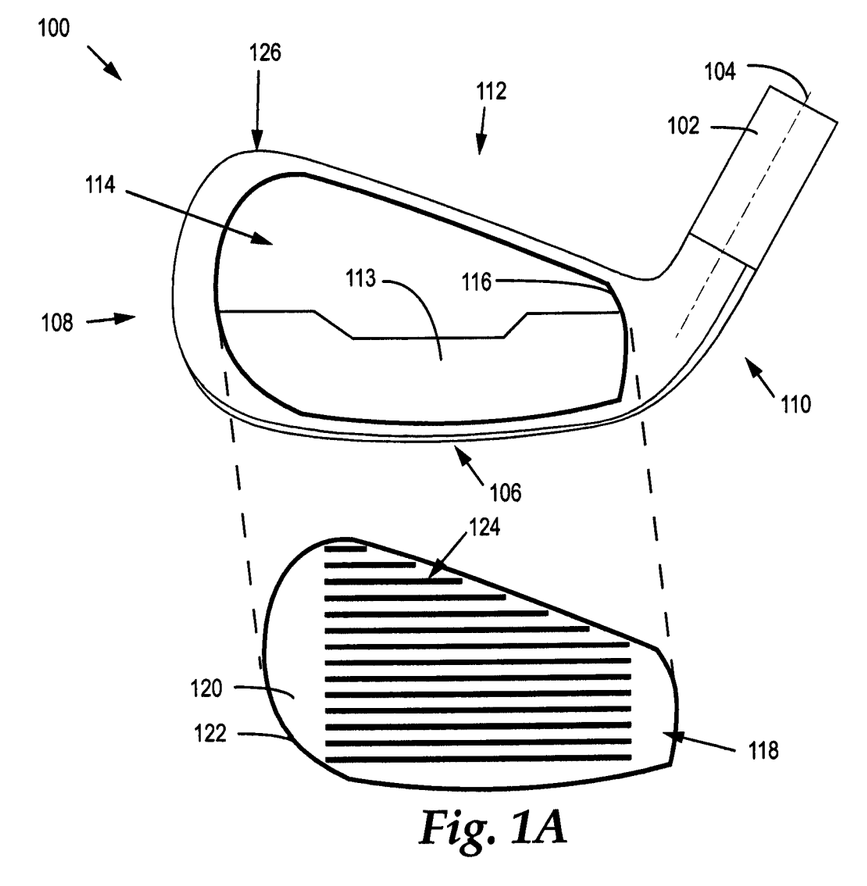
FIG. 1A is an exploded view of an embodiment of a golf club head according to the present disclosure.

FIG. 1A illustrates a golf club head 100 including a first piece striking plate 118 and a second piece 126. The first piece striking plate 118 is a portion of a front striking surface. The second piece 126 is attached to the first piece 118 to form the golf club head 100.

FIG. 1A further illustrates the first piece striking plate 118 being a portion of the front striking surface of the golf club head 100 and having a first piece front surface 120. The first piece front surface 120 includes grooves 124 in accordance with The Rules of Golf issued by the United States Golf Association (USGA). The first piece striking plate 118 also includes a first contact surface 122 extending away from a perimeter of the front surface 120.

The second piece 126 includes a hosel 102, a hosel axis 104, a sole portion 106, a toe portion 108, a heel portion 110, a top-line portion 112, a cavity back wall 113, a front opening 114, and a second contact surface 116.

Figure 1B:
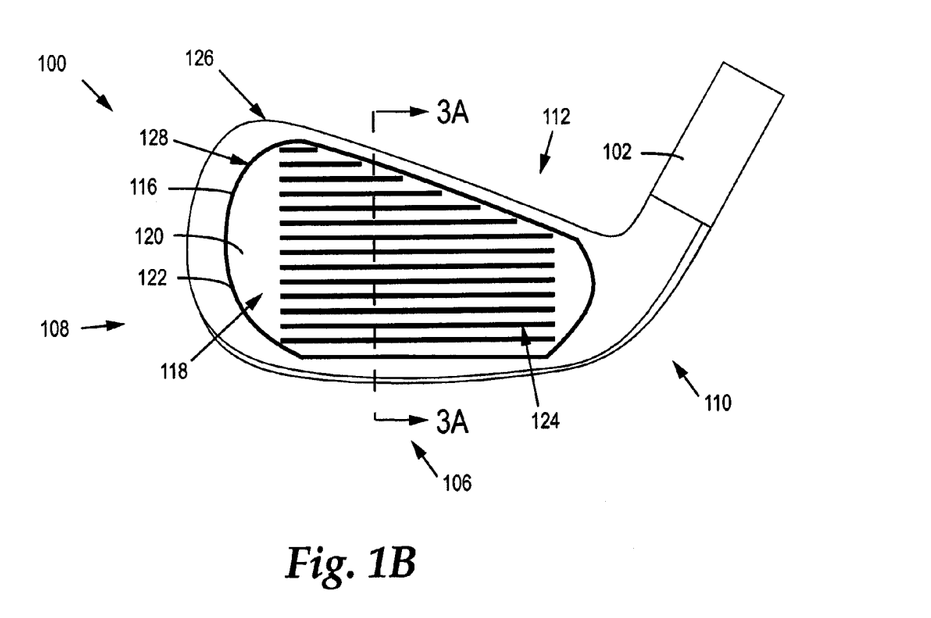
FIG. 1B is an assembled view of the golf club head of FIG. 1A.

FIG. 1B illustrates the golf club head 100 after the first piece striking plate 118 is inserted into the second piece 126 and welded. In one embodiment, a front weld bead 128 is formed from a continuous laser weld or plasma weld that extends along a contact interface between the first contact surface 122 and second contact surface 116. In certain embodiments, the welding occurs on the front striking surface of the golf club head 100 while creating a front weld bead 128 on the front striking surface and a rear weld bead on the rear face surface located behind a portion of the front striking surface.

FIG. 1B shows the front weld bead 128 created immediately after a welding operation and prior to finishing. In one embodiment, the weld contour matches the outer profile contours of the top-line portion, the toe portion, and the sole portion. In one embodiment, the weld contour can enclose the set of grooves 124 that are machined or cast into the front piece striking plate 118. In another embodiment, the grooves 124 can be added after the welding operation and can overlap with the weld contour in certain locations.

Figure 2:
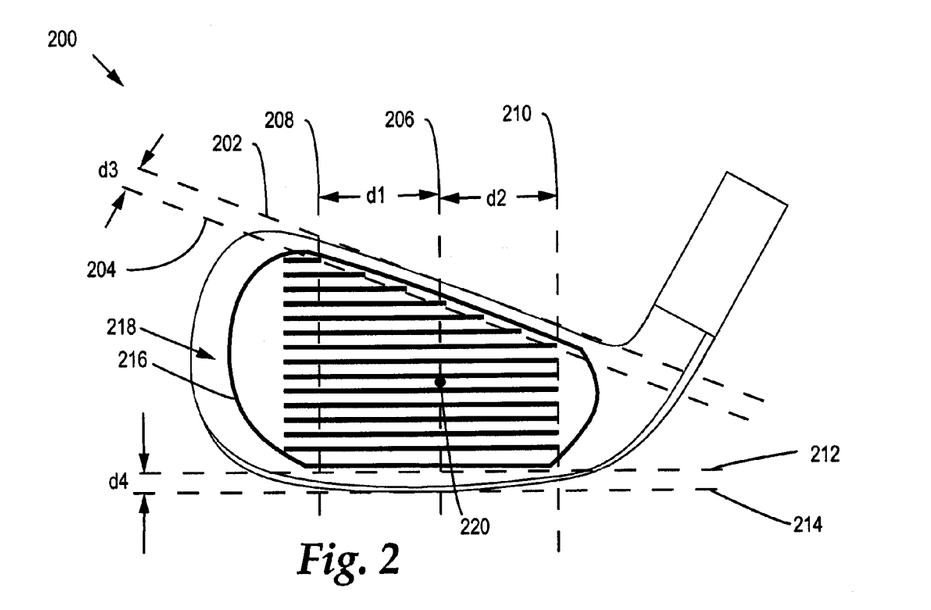
FIG. 2 is an illustration of a golf club head and an impact area.

FIG. 2 shows a golf club head 200 with a front weld contour 216 and the weld contour 216 placement with respect to an impact area. In defining the impact area, a center line axis 206, a toe offset axis 208, a heel offset axis 210, a top-line axis 202, a top-line offset axis 204, a sole axis 214, and a sole offset axis 212 are shown to be coplanar across the striking face 218 of the golf club head 200. The center line 206 passes through an ideal center striking point 220. The toe offset axis 208 and heel offset axis 210 are parallel and coplanar with the center line axis 206. The toe offset axis 208 is offset from the center line axis 206 by a distance, d1. The heel offset axis 210 is offset from the center line axis 206 by a distance, d2.

The top-line axis 202 is parallel with the top-line edge. In cases where the top-line edge is non-linear, the top-line axis 202 is tangent to the outermost top-line edge while remaining primarily parallel with the top-line edge. The top-line offset axis 204 is coplanar, parallel, and offset from the top-line axis 202 by a distance, d3. Similarly, the sole axis 214 is tangent and primarily parallel with the sole edge. The sole offset axis 212 is coplanar, parallel, and offset from the sole axis 214 by a distance, d4.

In one embodiment, the impact area is defined as the part of the front striking face 218 that lies within 0.80 inches (20 mm, dimensions d1,d2) on either side of a vertical center line 206 of the face 218, but excluding strips that are 0.25 inches (6.35 mm, dimensions d3,d4) wide from the top and bottom edges of the club head. In other words, the impact area is defined by the top-line offset axis 204, the toe offset axis 208, the heel offset axis 210, and the sole offset axis 212 within a striking face plane.

FIG. 2 further shows the weld contour 216, in one embodiment, extending at least partially into the impact area. In certain embodiments, the weld contour 216 can be located entirely within the impact area or entirely outside of the impact area.

Figure 3A:
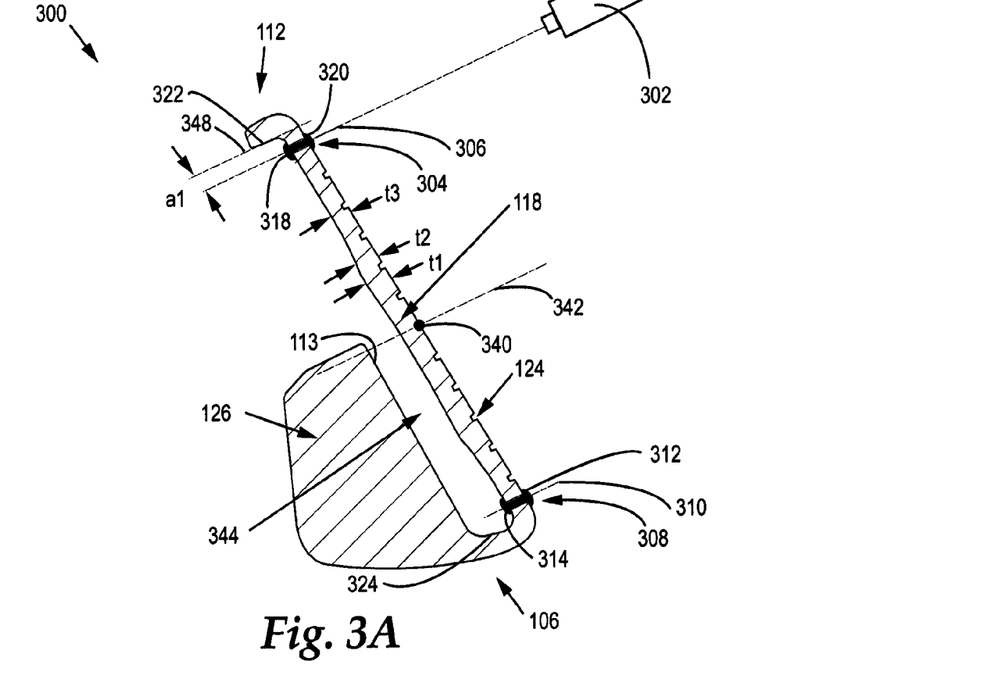
FIG. 3A is a cross-sectional view of the golf club head taken along section lines 3A-3A in FIG. 1B.

FIG. 3A shows a cross-sectional view along cross-section lines 3A-3A (passing through a face center point) in FIG. 1B. FIG. 3A illustrates a cross-sectional profile 300 including a cavity back wall 113 forming a cavity with the first piece striking plate 118. A weld is created by a welding device 302, such as a laser or plasma weld. In one embodiment, the weld is applied on the front face of the golf club head 300 from a frontward to rearward direction. A top weld line 304 including a top weld axis 306 is shown. The weld axis 306 is co-axial with the direction that the weld is applied (in the case of laser welding). In addition, a bottom weld line 308 including a bottom axis 310 is shown. In one embodiment, it is understood that the top weld line 304 and bottom weld line 308 can be part of the same continuous weld line or can be two separate and distinct weld lines. The weld can be any type of weld including (but not limited to) bead, groove, fillet, surfacing, tack, plug, slot, friction, and resistance welds.

FIG. 3A shows a butt weld made by a laser that includes a narrow and deep fusion zone and a narrow heat affected zone flanking the fusion zone, as will be discussed in further detail. The interface surface between the first 122 and second 116 contact surfaces is perpendicular to the plane of the face. The depths of these weld zones extend along respective weld axes 306,310 that are parallel to the direction of load in a face-normal direction.

Compared to TIG welding and other welding techniques, laser welding can be advantageous by concentrating more energy at the weld site. Laser welding also produces a more localized melt, less material interdiffusion, and reduced material fatigue during subsequent use.

In one example, a laser weld operation is performed on the contact interface surface while the first piece 118 and second piece 126 are held together using a clamp or fixture to ensure a gap between the first 122 and second 116 contact surfaces is minimized.

FIG. 3A further shows the top weld line 304 having a front weld bead 320 and a rear weld bead 318 prior to finishing. In addition, the bottom weld line 308 also includes a front weld bead 312 and a rear weld bead 314.

FIG. 3A also shows a cross-sectional profile of a variable thickness across the first piece striking plate 118. The thickest portion of the first piece striking plate 118 has a thickness, t1. The thinnest portion of the first piece striking plate 118 has a thickness, t3. A transition region between the thinnest and thickest portions has a thickness, t2, that is thinner than the thickest portion, t1, but thicker than the thinnest portion, t3. The thicknesses t1,t2,t3 described above contribute to a particular profile of an inverted cone region, as will be described in further detail.

FIG. 3A illustrates an upper return wall 322 and a lower return wall 324. The upper and lower return walls 322,324 extend away from the first piece striking plate 118 toward a rear portion of the club head 100. In other words, the upper and lower return walls 322,324 extend in a general direction normal to the face. It is understood that the return walls 322, 324 may not be perfectly perpendicular to the face plane in certain embodiments. In one embodiment, the upper and lower return walls 322,324 define a portion of the cavity 344 located behind the first piece striking plate 118. The upper return wall 322 can be defined as the portion of a return wall that is above a horizontal plane 342 that is perpendicular to the face plane (parallel with the score-lines) passing through a center point 340. Subsequently, the rear lower return wall 324 can be defined as any return wall portion below the horizontal plan 342 (toward the sole portion).

The upper and lower return walls 322, 324 can be one single continuous return wall that extends from the rear surface of the striking plate or two or more separate return wall portions. In other words, the entire return wall including an upper wall 322 and a lower wall 324 can extend 360° about the perimeter of the cavity 344. In another embodiment, the entire return wall only extends around the perimeter of the cavity 344 about 270° (relative to the center face) while excluding all or part of the upper wall 322 portion.

Both the top weld line 304 and bottom weld line 308 are located inwardly away from the upper and lower return walls 322, 324 toward the center point 340 of the front striking surface of the golf club head 300. In one embodiment, the top weld line 304 includes the weld axis 306 that is inwardly offset from the upper return wall 322 by a distance, a1 (described in further detail below). Similarly, the bottom weld line 308 includes the weld axis 310 that is inwardly offset from the lower return wall 324 by a distance a1. In one embodiment, the offset distance a1 is the same for the upper return wall 322 and lower return wall 324. In other embodiments, the offset distance, a1, can vary around a perimeter of the striking plate 118. In one embodiment, the offset distance a1 can be between about 1-5 mm, 1-10 mm, 1-15 mm, 1-20 mm, or at least 1 mm. In certain embodiments, the weld axes 304,308 are equally offset from the upper and lower return walls 322,324 by the offset distance a1 at all points around a periphery of the striking plate 118.

Figure 3B:
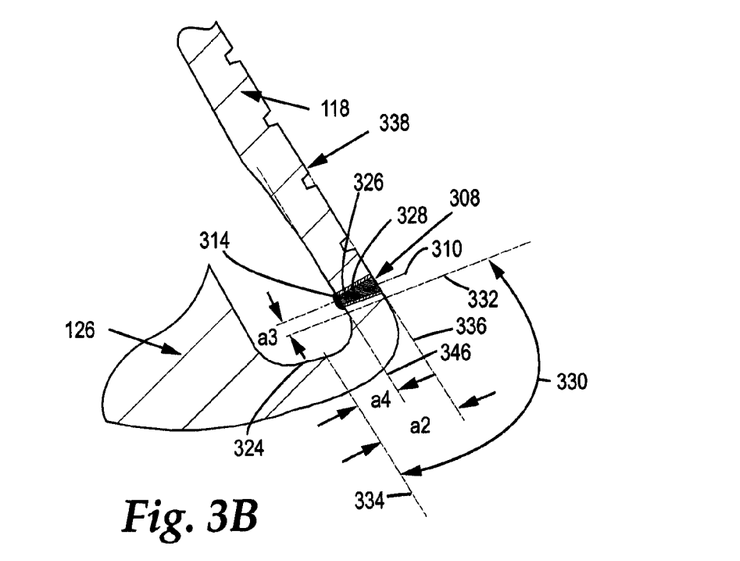
FIG. 3B is a magnified view of a weld zone.

FIG. 3B is an enlarged view of the bottom weld line 308 after the front weld bead 312 (and front bead 320, not shown) has been removed by machining or polishing to create a smooth front surface. FIG. 3B provides a clear view of the heat-affected zone 326 and the fusion zone 328 previously mentioned. The fusion zone 328 and heat affected zone 326 tend to be wider at the front surface and progressively narrower with increasing depth of the weld. The width of the weld zone including the heat affected zone 326 and fusion zone 328 is relatively narrow compared to a conventional weld.

At all locations around the 360° circumference of the contact interface, the respective weld axes and fusion zones extend substantially parallel to the direction of the ball impact force that is applied to the face during use. In one embodiment, all the weld axes are in the plane of the contact interface to provide a sufficient butt weld. The entire weld is located on the face of the club head and away from the return wall 322,324. In other words, the entire weld is located within the cavity 344 back portion of the golf club head and does not extend beyond any return wall 322,324 or into any hinge region.

In one embodiment, the first piece striking plate 118 is fitted to and aligned with the second piece 126 and is moved relative to the laser 302. It is understood that the laser can move relative to the assembly or both the laser and the assembly can move. In one embodiment, the laser is a $CO_2$ cw laser and has an adjustable output power in the range of 1350-2000 W. The welding can begin near the hosel and continue around the contact interface forming the front and rear weld bead. In one embodiment, the laser can move relative to the surface within the range of 40 to 80 cm/min.

After completion of the welding, the club head is subjected to a heat treatment for aging. The post-weld heat treatment is generally at 480-540° C. for four hours. The club head is also machine finished as required, such as grinding, polishing, or sandblasting, to smooth and topologically blend the surface of the weldment into the face plane. Finish machining is desirably followed by passivation. After completing finish-machining, it may be desirable to apply a suitable surface treatment of the club head, such as plating, painting, coating, or the like. Plating may be performed to produce a surface plating layer that protects against corrosion and is strong, durable, relatively inert, and aesthetically pleasing. Exemplary materials for forming a plating layer are Cr, Ni, and Cu. Exemplary techniques for forming the plating layer are electrode plating, electroless plating, physical vapor deposition (PVD), chemical vapor deposition (CVD), ion plating, and ion-beam-enhanced diffusion. An intermediate sublayer can be applied prior to the plating layer such as soft nickel, soft copper, and oxides.

FIG. 3B illustrates the weld penetrating 100% through the first piece striking plate 118. In one embodiment, the weld penetration is at least about 1 mm deep or at least 90% (of the thickness of the material) penetration to maintain sufficient strength and durability. In another embodiment, the weld penetration is between about 1-4 mm depending on the thickness of the material. In certain embodiments, the width of the fusion zone is about 2 mm to 3 mm wide (as measured in a plane parallel to the face plane). In one embodiment, the welding is not performed at a constant power or speed. The output of the laser and the progression rate of the laser around the circumference are controllably adjusted as required to apply more power for a longer time in regions where a deeper weld is desired.

FIG. 3B further shows a hinge region 330 or transition region located between the front striking surface 338 of the club and a lower return wall 324. For clarity, only the lower return wall 324 is shown in FIG. 3B although it is understood that a hinge region 330 can extend around the all or part of the periphery of the front striking surface 338. For example, a hinge region 330 can extend between the upper return wall 322 and front striking surface 338 as well. In one embodiment, the front striking surface 338 includes the first piece striking plate 118 in addition to a portion of the second piece 126 that is within the striking surface plane 336. In another embodiment, the fusion zone 328 can be located at the very edge of the front striking surface 338 just outside of the hinge region 330 (i.e. inward and away from the hinge region 330). Therefore, in certain embodiments, the front striking surface 338 can be entirely comprised of the first piece striking plate 118.

Locating the fusion zone 328 outside of the hinge region 330 allows for greater dimensional uniformity in the hinge region 330 during casting or forming of the second piece. The hinge region 330 is formed as a portion of the second piece 126.

Placing the fusion zone 328 outside of the hinge region 330 prevents any unintentional deformation of material within the hinge region 330 ensuring consistent mechanical characteristics and performance during impact in the hinge region 330. The mechanical characteristics (such as strength, bending stiffness, shear force, stress, strain, ductility etc.) of the hinge region 330 can be negatively impacted by the presence of a fusion zone 328 within the hinge region 330. The presence of a fusion zone 328 in the hinge region can create unwanted stress concentrations which may lead to mechanical failures.

A front striking surface plane 336 extends across the entire front striking surface 338 while being co-planar with the front striking surface 338 (excluding grooves). FIG. 3B further shows a face-hinge boundary line 332 which identifies the edge of the front striking surface 338 and the hinge region 330. The face-hinge boundary line 332 is generally perpendicular or normal to the front striking surface plane 336 around a periphery of the front striking surface 338. The face-hinge boundary line 332 is located at the point where the front striking surface 338 ends and a face contour or profile is no longer coplanar with the front striking surface plane 336.

The hinge region 330 is further defined by the hinge-rear wall boundary 334. The hinge-rear wall boundary 334 indicates the location where the hinge region 330 ends and the rear wall 324 begins. The hinge-rear wall boundary 334 is a plane parallel with the front striking surface plane 336 offset in a rearward direction toward the back of the club head 300. In one embodiment, the hinge-rear wall boundary 334 is offset from the front striking surface plane 336 by a distance, a2. In certain embodiments, the offset distance a2 is about 2-5 mm or about 2-20 mm toward the rear portion of the club head 300 depending on the thickness of the striking plate 118.

In one embodiment, the hinge-rear wall boundary 334 is primarily defined as a 1 mm offset from a rear surface plane 346. The rear surface plane 346 is a plane that is generally coplanar with the rear surface of the striking plate 118 having a relatively constant and thin thickness immediately outside and adjacent to the hinge region 330. In some embodiments, the rear surface plane 346 is generally perpendicular to the face-hinge boundary line 332. The hinge-rear boundary 334 is parallel with the rear surface plane 346 and offset by a distance, a4. In a preferred embodiment, the hinge-rear boundary 334 is offset from the rear surface plane 346 by at least about 1 mm. In certain embodiments the offset distance, a4, is about 1 mm.

In addition, the face-hinge boundary line 332 is offset a minimum distance, a3, from the weld line axis 310 measured across the striking surface plane 336. In one embodiment, the offset distance a3 is about 1 mm while still remaining outside the hinge region 330. In certain embodiments, the offset distance a3 is between about 1-10 mm, and preferably between at least about 1-5 mm or at least 1 mm. In embodiments where the weld bead 314 does not follow the peripheral contour of the face-hinge boundary line 332, the a3 offset distance can vary for different shaped face welds. A weld having a distance, a3, of zero would be located directly on the face-hinge boundary line 332 and would therefore undesirably create a weld in the hinge region 330.

In some embodiments, the a3 offset distance (related to face-hinge boundary 332) and the a1 offset distance (related to rear wall) may be equal depending on the construction. The weld axes 310,306 should always be placed outside of the hinge region and inward (toward the center) of any return wall that may be present.

Figure 3C:
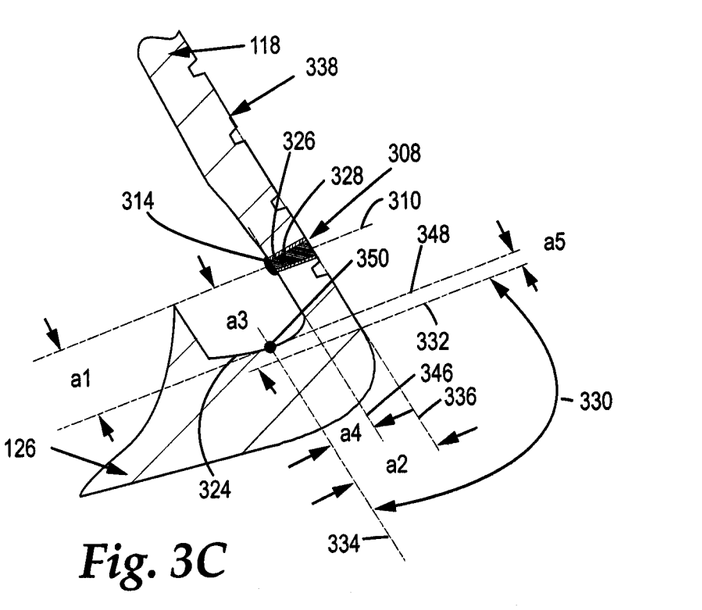
FIG. 3C is a magnified view of a weld zone.

FIG. 3C illustrates a magnified hinge region according to another embodiment similar to FIG. 3B. However, the lower return wall 324 is located inwardly toward the center of the club face and above the face-hinge boundary 332. A return wall plane 348 is shown to be located a certain distance, a5, above the face-hinge boundary 332. The distance a5 can be any distance depending on the location of the rear wall 324 with respect to the face-hinge boundary 332. The return wall plane 348 is normal and perpendicular to the striking surface plane 336 and the hinge-rear wall boundary 334. The hinge-rear wall boundary 334 intersects with a return wall profile at an intersection point 350. The return wall plane 348 intersects with the hinge-rear wall boundary 334 at the intersection point 350. Subsequently, the weld axes 310,306 are offset by the offset distance a1 from the return wall plane 348. In one embodiment, the offset distance, a1, is about 1 mm or more, as described herein.

The location of the weld bead 314 and fusion zone 328 with respect to the hinge region 330 is critical to achieving a high COR (coefficient of restitution), thin face, cavity back iron having consistent hinge region performance while saving mass in the face to be allocated to other regions of the golf club head. In some embodiments, the COR is greater than 0.790. Preferably, the COR is at least 0.80 as measured according to the USGA Rules of Golf. The COR can even be as high as 0.83.

In certain embodiments, the first piece striking plate 118 can be forged maraging steel, maraging stainless steel, or precipitation-hardened (PH) stainless steel. In general, maraging steels have high strength, toughness, and malleability. Being low in carbon, they derive their strength from precipitation of inter-metallic substances other than carbon. The principle alloying element is nickel (15% to nearly 30%). Other alloying elements producing inter-metallic precipitates in these steels include cobalt, molybdenum, and titanium. In one embodiment, the maraging steel contains 18% nickel. Maraging stainless steels have less nickel than maraging steels but include significant chromium to inhibit rust. The chromium augments hardenability despite the reduced nickel content, which ensures the steel can transform to martensite when appropriately heat-treated. In another embodiment, a maraging stainless steel C455 is utilized as the first piece striking plate 118. In other embodiments, the first piece striking plate 118 is a precipitation hardened stainless steel such as 17-4, 15-5, or 17-7.

The first piece striking plate 118 can be forged by hot press forging using any of the described materials in a progressive series of dies. After forging, the first piece striking plate 118 is subjected to heat-treatment. For example, 17-4 PH stainless steel forgings are heat treated by 1040° C. for 90 minutes and then solution quenched. In another example, C455 stainless steel forgings are solution heat-treated at 830° C. for 90 minutes and then quenched.

In one embodiment, the second piece 126 is made from carbon steel (e.g., 1020, 1030, or 1040 carbon steel), chrome-molybdenum steel (e.g., 4140 Cr—Mo steel), Ni—Cr—Mo steel (e.g. 8620 Ni—Cr—Mo steel), austenitic stainless steel (e.g., 304, N50, or N60 stainless steel (e.g., 410 stainless steel).

The second piece 126 can include various features such as weighting elements, cartridges, and/or inserts or applied bodies as used for CG placement, vibration control or damping, or acoustic control or damping. For example, U.S. Pat. No. 6,811,496, incorporated herein by reference in its entirely, discloses the attachment of mass altering pins or cartridge weighting elements.

After forming the first piece striking plate 118 and the second piece 126, the first 122 and second 116 contact surfaces can be finish-machined to ensure a good interface contact surface is provided prior to welding. In one embodiment, the first 122 and second 116 contact surfaces are planar for ease of finish machining and engagement.

It is possible that an alignment aid can be used to ensure the first piece striking plate 118 engages with the second piece 126. In one embodiment, an alignment aid can include an edge, lip, pin, nubbin, male-female detents, or similar aides that ensure the interface surfaces are brought into mating engagement. Moreover, the interface surfaces can have complex complementary contours.

Figure 4:
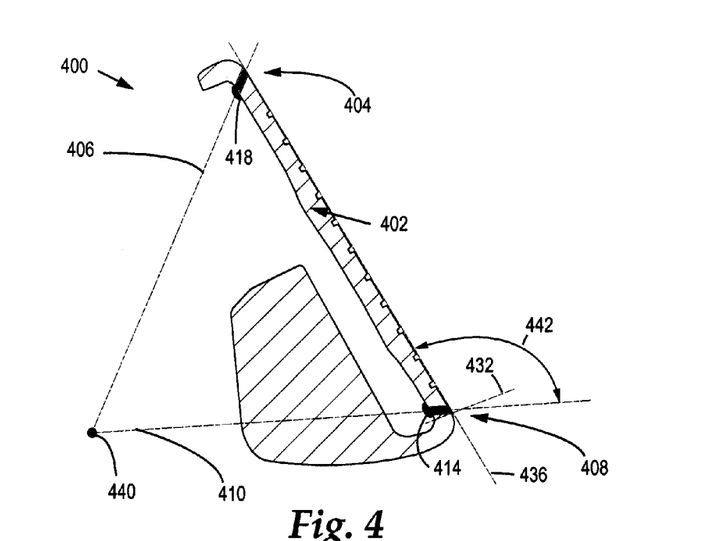
FIG. 4 is a cross-sectional view of a golf club head according to an embodiment.

FIG. 4 illustrates another embodiment including a club head 400, a first piece striking plate 402, a top line weld 404, a top rear weld bead 418, a top weld axis 406, a striking face plane 436, a bottom line weld 408, a bottom rear weld bead 414, a bottom weld axis 410, and a face-hinge boundary line 432, as similarly described above.

FIG. 4 further shows a weld axis convergence point 440 where the top weld axis 406 and the bottom weld axis 410 intersect or converge. In the embodiment shown, the convergence point 440 occurs behind the striking face plane 436 in a rearward direction relative to the club head 400. It is understood that the top weld axis 406 and bottom weld axis 410 would form a weld axis plane as the weld is created about the periphery of the first piece striking plate 402. The weld axis angle 442 is created between both weld axis 406,410 and the first piece striking plate 402. In one embodiment the weld axis angle 442 is between about 90° to about 180°. For example, the weld axis angle 442 can be about 135°. In certain embodiments, the weld axis angle 442 is at least less than about 180°.

Figure 5:
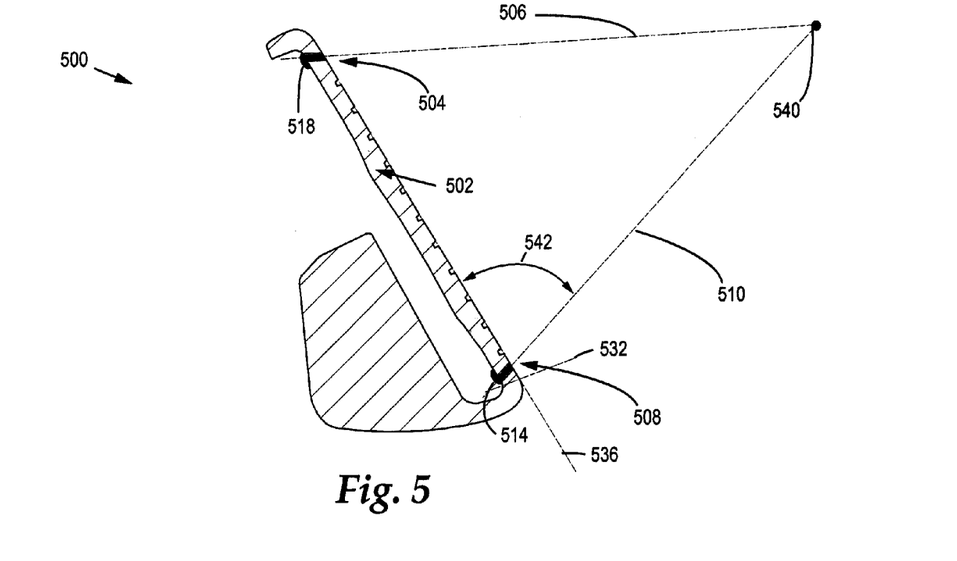
FIG. 5 is a cross-sectional view of a golf club head according to an embodiment.

FIG. 5 illustrates yet another embodiment including a club head 500, a first piece striking plate 502, a top line weld 504, a top rear weld bead 518, a top weld axis 506, a striking face plane 536, a bottom weld 508, a bottom rear weld bead 514, a bottom weld axis 510, and a face-hinge boundary line 532 as similarly described above.

FIG. 5 further shows a weld axis convergence point 540 where the top weld axis 506 and the bottom weld axis 510 intersect or converge. In the embodiment shown, the convergence point 540 occurs in front of the striking face plane 536 in a forward direction relative to the club head 500. In one embodiment the weld axis angle 542 is between about 0° to about 90° relative to the first piece striking plate 502. In certain embodiments, the weld axis angle 542 is less than 90°.

Figure 6:
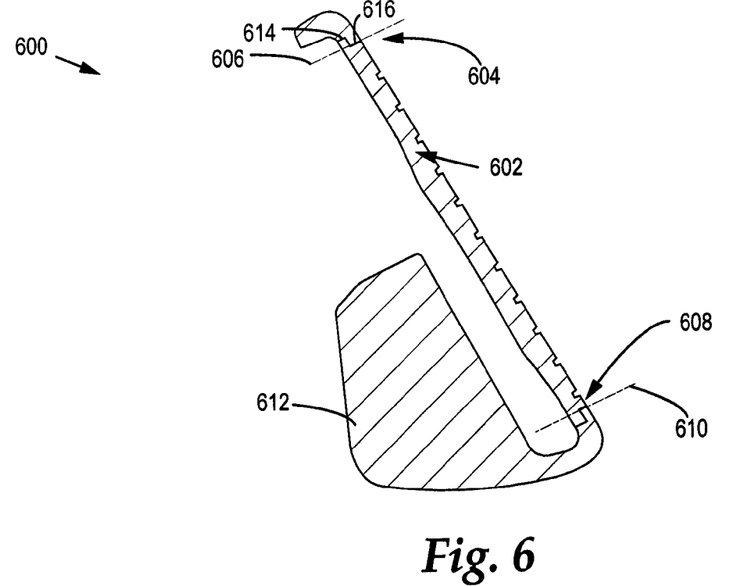
FIG. 6 is a cross-sectional view of a golf club head according to an embodiment.

FIG. 6 illustrates another embodiment including a golf club head 600 having a lap joint created between the first piece striking plate 602 and the second piece 612. The golf club head 600 includes a top line weld 604, a bottom line weld 608, a top weld axis 606, and a bottom weld axis 610 as similarly described above. The lap joint created includes a front edge 616 located around a periphery of the striking plate 602 and a rear edge 614. In one embodiment, both the front edge 616 and the rear edge 614 are parallel with the weld axes 606,610. The weld axes 606,610 are aligned with the front edge 616 so that a weld is primarily created at the interface between the front edge 616 and the second piece 612. It is understood that in some embodiments, the front edge 616 and rear edge 614 may be non-parallel with the weld axes 606,610. In one embodiment, the maximum radial diameter of the front edge 616 across the face plane is less than the maximum radial diameter of the rear edge 614 across the face plane.

Figure 7:
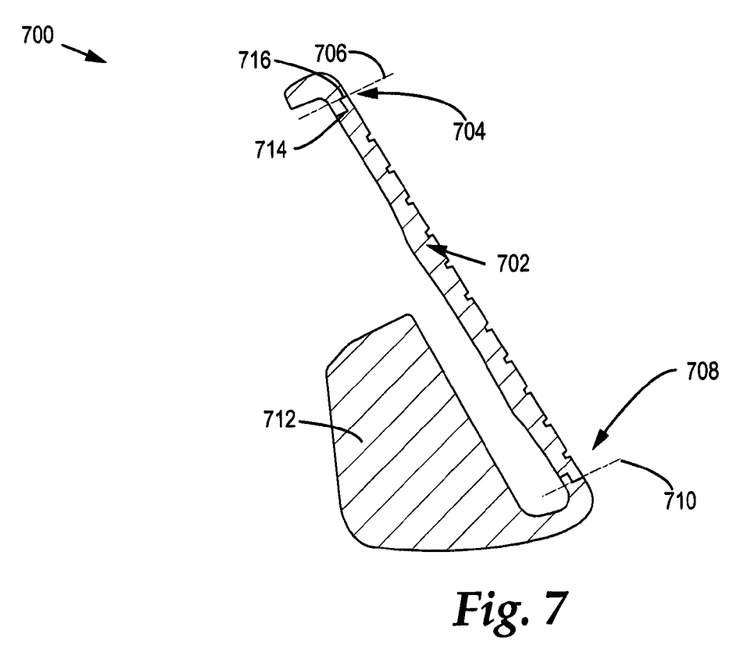
FIG. 7 is a cross-sectional view of a golf club head according to an embodiment.

FIG. 7 illustrates another embodiment including a golf club head 700 having a lap joint. The golf club head 700 further includes a first piece striking plate 702, a second piece 712, a top line weld 704, a bottom line weld 708, a top weld axis 706, a bottom weld axis 710, a front edge 716, and a rear edge 714. In one embodiment, the maximum radial diameter of the front edge 716 is larger than the maximum radial diameter of the rear edge 714 across the face plane. The weld axes 706,710 are aligned and parallel with the front edge 716 to create a weld at the front edge 716 interface with the second piece 712.

Figure 8:
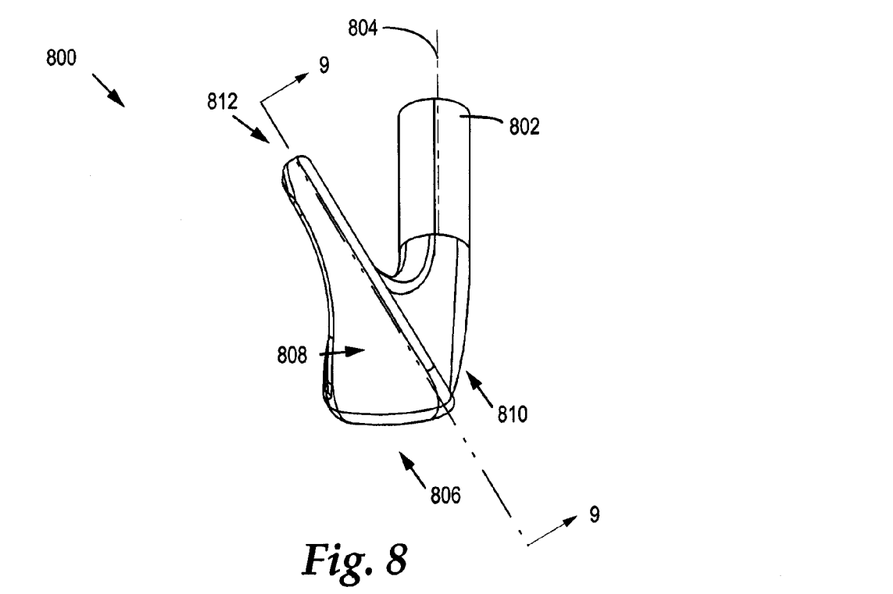
FIG. 8 is a toe perspective view of a golf club head.

FIG. 8 illustrates a toe view of a golf club head 800 having a hosel 802, a hosel axis 804, a sole portion 806, a toe portion 808, a heel portion 810, and a top-line portion 812.

Figure 9:
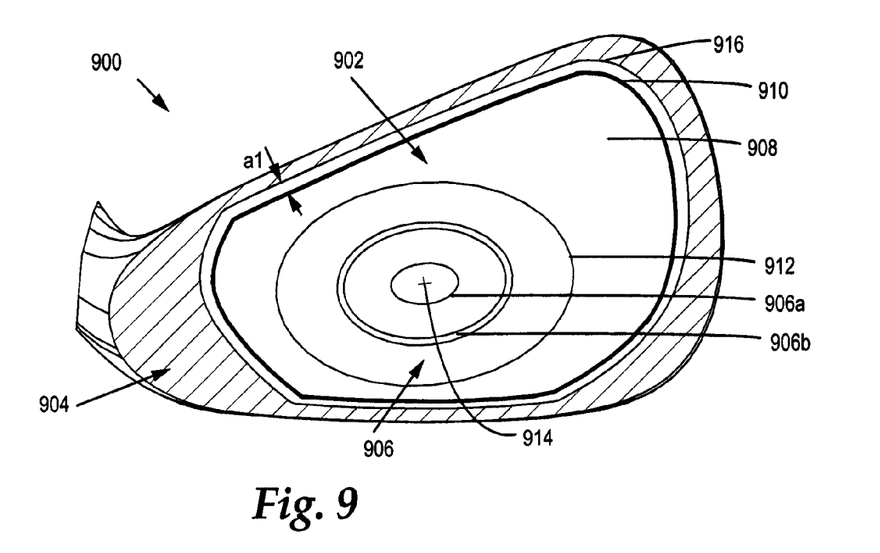
FIG. 9 is a cross-sectional view of the golf club head taken along section lines 9-9 in FIG. 8.

FIG. 9 is a cross-sectional view of the golf club head 800 taken along the cross-sectional lines 9-9 in FIG. 8, according to one embodiment. FIG. 9 illustrates a first piece striking plate 902 and rear second piece 904. The first piece striking plate 902 includes "inverted cone technology" 906 (hereinafter, "ICT"), a thin face area 908, a inverted cone region edge 912, center point 914, and a rear weld bead 910. The ICT region 906 can be considered a sweet spot where an ideal impact can occur at the center point 914. Variable thickness configurations or inverted cone configurations are discussed in, for example, U.S. Pat. Nos. 6,800,038, 6,824,475, 6,904, 663, and 6,997,820, all incorporated herein by reference.

The inverted cone region 906 is an ellipse (of which the major axis is nearly horizontal), including a central zone 906a and a surrounding ridge 906b. In one embodiment, the thin face area 908 has a nominal thickness of about 1.8 mm. The ridge 906b can have a thickness of about 2.0 mm. In the region located between the ridge 906b and the ICT region edge 912, the thickness of the face tapers down to a thickness of about 1.8 mm. In other embodiments, various profile thicknesses in the range of 1.6 mm to less than 2.5 mm are possible. In some embodiments, the thin face thickness is less than 2.0 mm. The thickness profiles and low thickness values can be achieved during forging of the first piece striking plate 902.

In one embodiment, a 0.5 mm to 1.0 mm machine stock plate can be added to the first piece striking plate 902 to increase tolerance control. After forging, the first piece striking plate 902 can be slightly milled and engraved with scorelines. A key advantage of being able to forge such a thin face is the freeing up of discretionary mass (up to about 20 g) that can be placed elsewhere in the club head (such as the rear piece) for manipulation of the moment of inertia or center of gravity location.

The thickness of the first piece striking plate 902 in the thin face area 908 is generally consistent in thickness and non-variable. Of course, manufacturing tolerances may cause some variation in the thin face area 908. The thin face area 908 and the ICT region 906 can be considered the "unsupported" face area of the striking face because the thickness dimensions are relatively thin in those areas.

FIG. 9 further shows the weld bead 910 being offset by a distance a1 (previously described in FIG. 3A) all along a perimeter of the return wall 916. Exemplary club head geometries for representative club heads are described in Tables 1-9 below. The exemplary club heads (examples 1-9) in Tables 1-9 are similar to the embodiment of FIG. 9 in that the weld bead 910 axis is offset from the return wall 916 by a minimal a1 distance in the range of about 1-5 mm or at least 1 mm. In some embodiments, the a1 distance is between about 1-4 mm.

The tabulated values in Tables 1-9 are total face area, thin face area, thin face thickness, thin face area %, Inverted Cone Technology (ICT) region, and the First Piece Striking Plate Surface Area (FPSPSA).

The "total face area" is defined as the area of face contained within a face plane on a front striking portion of the club head. The "thin face area" is defined as the portion of the first piece striking plate that is generally unsupported, constant in thickness, and thin. For example, the thin face area 908 shown in FIG. 9 illustrates an exemplary unsupported thin face area. The thin face area 908 excludes the inverted cone region and any region that is located outside of the weld bead 910. The "thin face thickness" is the nominal thickness of the first piece striking plate in the thin face area 908 as shown as dimension t3, in FIG. 3A. The "thin face area %" is the percentage of the total face area that includes a thin face area having the thickness, t3 (excluding the ICT region). The thin face area percentage is the thin face area divided by the total face area multiplied by 100. The "inverted cone region" is the surface area contained by the variable thickness region 906 or inverted cone area. Furthermore, the "First Piece Striking Plate Surface Area" is the rear surface area of the first piece striking plate 902 contained within the continuous weld bead 910 (including an ICT region).

EXAMPLE 1

TABLE 1

| Club head | Total Face Area (mm$^2$) | Thin Face Area (mm$^2$) | Thin Face Thickness (mm) | Thin Face Area % | ICT Region (mm$^2$) | FPSPSA (mm$^2$) |
|---|---|---|---|---|---|---|
| 3-iron | 2,825 | 1,633 | 2.1 | 57 | 541 | 2,175 |
| 6-iron | 2,964 | 1,735 | 2.1 | 58 | 541 | 2,276 |
| 9-iron | 3,116 | 1,553 | 2.1 | 49 | 541 | 2,094 |
| Wedge | 3,452 | 1,804 | 2.1 | 52 | 541 | 2,345 |

EXAMPLE 2

TABLE 2

| Club head | Total Face Area (mm$^2$) | Thin Face Area (mm$^2$) | Thin Face Thickness (mm) | Thin Face Area % | ICT Region (mm$^2$) | FPSPSA (mm$^2$) |
|---|---|---|---|---|---|---|
| 3-iron | 2,824 | 1,876 | 2.4 | 66 | 527 | 2,403 |
| 6-iron | 2,962 | 1,945 | 2.4 | 65 | 527 | 2,473 |
| 9-iron | 3,113 | 1,717 | 2.4 | 55 | 527 | 2,245 |
| Wedge | 3,451 | 2,012 | 2.4 | 58 | 527 | 2,540 |

EXAMPLE 3

TABLE 3

| Club head | Total Face Area (mm$^2$) | Thin Face Area (mm$^2$) | Thin Face Thickness (mm) | Thin Face Area % | ICT Region (mm$^2$) | FPSPSA (mm$^2$) |
|---|---|---|---|---|---|---|
| 3-iron | 2,792 | 1,242 | 2.5 | 44 | 388 | 1,631 |
| 6-iron | 2,965 | 1,219 | 2.5 | 41 | 388 | 1,608 |
| 9-iron | 3,151 | 1,208 | 2.5 | 38 | 388 | 1,597 |
| Wedge | 3,304 | 1,130 | 2.5 | 34 | 388 | 1,519 |

EXAMPLE 4

TABLE 4

| Club head | Total Face Area (mm$^2$) | Thin Face Area (mm$^2$) | Thin Face Thickness (mm) | Thin Face Area % | ICT Region (mm$^2$) | FPSPSA (mm$^2$) |
|---|---|---|---|---|---|---|
| 3-iron | 2,796 | 1,313 | 2.2 | 46 | 247 | 1,560 |
| 6-iron | 2,934 | 1,281 | 2.2 | 43 | 247 | 1,529 |
| 9-iron | 3,084 | 1,232 | 2.4 | 39 | 247 | 1,479 |
| Wedge | 3,421 | 1,464 | 2.4 | 42 | 247 | 1,711 |

EXAMPLE 5

TABLE 5

| Club head | Total Face Area (mm$^2$) | Thin Face Area (mm$^2$) | Thin Face Thickness (mm) | Thin Face Area % | ICT Region (mm$^2$) | FPSPSA (mm$^2$) |
|---|---|---|---|---|---|---|
| 3-iron | 2,763 | 1,906 | 2.4 | 68 | 314 | 2,220 |
| 6-iron | 2,974 | 1,892 | 2.4 | 63 | 314 | 2,206 |
| 9-iron | 3,376 | 1,926 | 2.4 | 57 | 314 | 2,240 |
| Wedge | 3,421 | 1,741 | 2.4 | 50 | 314 | 2,055 |

EXAMPLE 6

TABLE 6

| Club head | Total Face Area (mm$^2$) | Thin Face Area (mm$^2$) | Thin Face Thickness (mm) | Thin Face Area % | ICT Region (mm$^2$) | FPSPSA (mm$^2$) |
|---|---|---|---|---|---|---|
| 3-iron | 2,790 | 1327 | 2.5 | 47 | 239 | 1,567 |
| 6-iron | 2,958 | 1426 | 2.5 | 48 | 292 | 1,719 |
| 9-iron | 3,150 | 1313 | 2.5 | 41 | 308 | 1,621 |
| Wedge | 3,301 | 1314 | 2.5 | 39 | 313 | 1,627 |

EXAMPLE 7

TABLE 7

| Club head | Total Face Area (mm$^2$) | Thin Face Area (mm$^2$) | Thin Face Thickness (mm) | Thin Face Area % | ICT Region (mm$^2$) | FPSPSA (mm$^2$) |
|---|---|---|---|---|---|---|
| 3-iron | 3,153 | 1459 | 1.9 | 46 | 1,136 | 2,595 |
| 6-iron | 3,104 | 1118 | 2.2 | 36 | 1,134 | 2,253 |
| 9-iron | 3,150 | 920 | 2.5 | 29 | 969 | 1,889 |
| Wedge | 3,348 | 922 | 2.5 | 27 | 1,017 | 1,939 |

The tabulated values are representative and other configurations can be provided as described herein. It should be noted, in the above examples, that the larger the thin face area percentage and thin face area, the more mass savings can be achieved in the first piece striking plate. In addition, the first piece striking plate rear surface area surrounded by the weld bead can be an indication of how much mass savings is achieved. A balance is achieved by the FPSPSA to achieve mass savings while also locating the weld bead in an advantageous position away from a hinge area and return wall to achieve a reliably high COR with a thin face. Also, locating the weld bead away from the hinge region will reduce the possibility of corrosion and rust in the hinge region over time.

Figure 10:
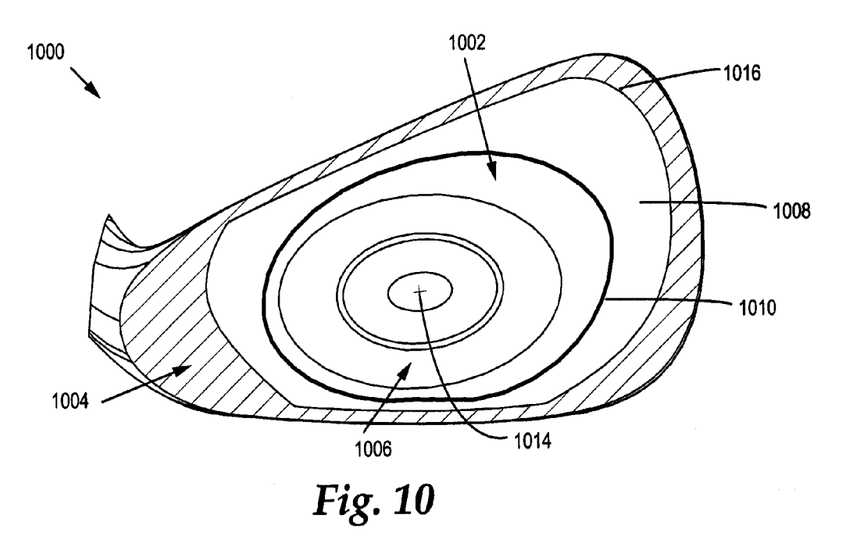
FIG. 10 is a cross-sectional view of a golf club head according to an embodiment.

FIG. 10 illustrates another embodiment having similar characteristics of the embodiment shown in FIG. 9. A golf club head 1000 includes a first piece striking plate 1002, a rear piece 1004, an ICT region 1006, a center point 1014, a return wall 1016, a thin face area 1008, and a weld bead 1010. The weld bead 1010 is strategically located in a low stress zone located within the thin face area 1008. In one embodiment, a zone having the lowest stress is identified in order to place the weld 1010 in such a zone. Strategically placing the weld 1010 in a low stress zone reduces the likelihood that the weld will mechanically fail upon impact. FIG. 10 further shows the weld 1010 being non-conforming with the peripheral contour of the return wall 1016. In other words, the weld contour 1010 across the face plane is independent of the return wall contour. The same thin face area and thin face thickness dimensions of Tables 1-7 can be achieved.

Figure 11:
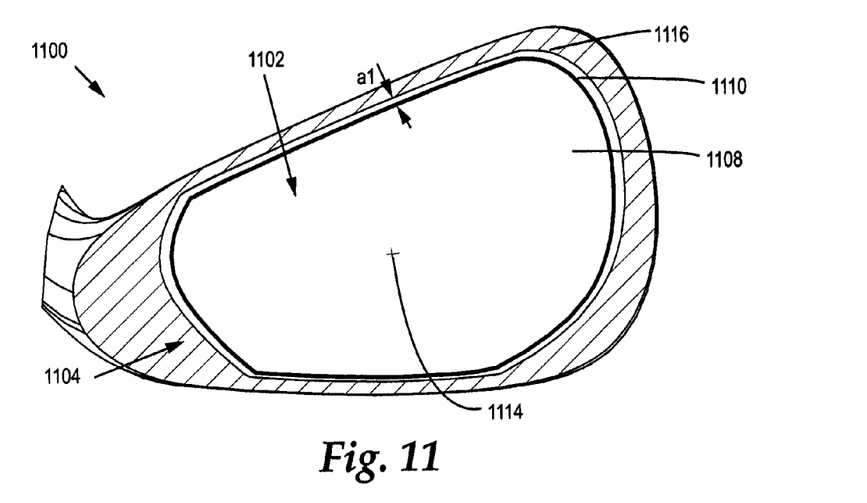
FIG. 11 is a cross-sectional view of a golf club head according to an embodiment.

FIG. 11 illustrates yet another embodiment of a golf club head 100 including a first piece striking plate 1102, a second piece 1104, a thin face area 1108, a weld bead 1110, a center point 1114, and a rear wall contour 1116. The inverted cone region is no longer present and the thin face area 1108 is a constant flat thickness (with some manufacturing tolerance variation) across the entire surface of the first piece striking plate 1102. The weld bead 1110 is offset from the rear wall contour 1116 by a distance, a1, as similarly described above.

The exemplary golf club heads (examples 8-9) in Tables 8 and 9 below are similar in construction to the embodiment shown in FIG. 11. The ICT Region is not applicable since the first piece striking plate 1102 is a constant thickness. Therefore, the thin face area and the first piece striking plate area surrounded by the weld bead are the same.

EXAMPLE 8

TABLE 8

| Club head | Total Face Area (mm²) | Thin Face Area (mm²) | Thin Face Thickness (mm) | Thin Face Area % | ICT Region (mm²) | FPSPSA (mm²) |
|---|---|---|---|---|---|---|
| 3-iron | 2,918 | 1,205 | 2.1 | 41 | NA | 1,205 |
| 6-iron | 3,068 | 1,216 | 2.1 | 40 | NA | 1,216 |
| 9-iron | 3,220 | 1,091 | 2.1 | 34 | NA | 1,091 |
| Wedge | 3,440 | 1,067 | 2.1 | 31 | NA | 1,067 |

EXAMPLE 9

TABLE 9

| Club head | Total Face Area (mm²) | Thin Face Area (mm²) | Thin Face Thickness (mm) | Thin Face Area % | ICT Region (mm²) | FPSPSA (mm²) |
|---|---|---|---|---|---|---|
| 3-iron | 2,782 | 672 | 2.0 | 24 | NA | 672 |
| 6-iron | 2,958 | 681 | 2.0 | 23 | NA | 681 |
| 9-iron | 3,159 | 576 | 2.0 | 18 | NA | 576 |
| Wedge | 3,354 | 489 | 2.0 | 14 | NA | 489 |

In the examples provided in Tables 1-9, a total face area can be in a range of about 2,700 mm² to about 3,500 mm². The FPSPSA can be in a range of about 300 mm² to about 4,000 mm², or preferably 450 mm² to about 2,600 mm². The thin face thickness can be in a range of about 1.0 mm-3.0 mm, preferably 1.5-2.5 mm, and also preferably in a range of about 1.6-2.0 mm. In certain embodiments, the thin face thickness is less than about 2.0 mm. The thin face area percentage can be in a range of about 13-70%. In embodiments having an ICT region, the ICT region surface area can range from about 230 mm² to about 2,000 mm².

Figure 12A:
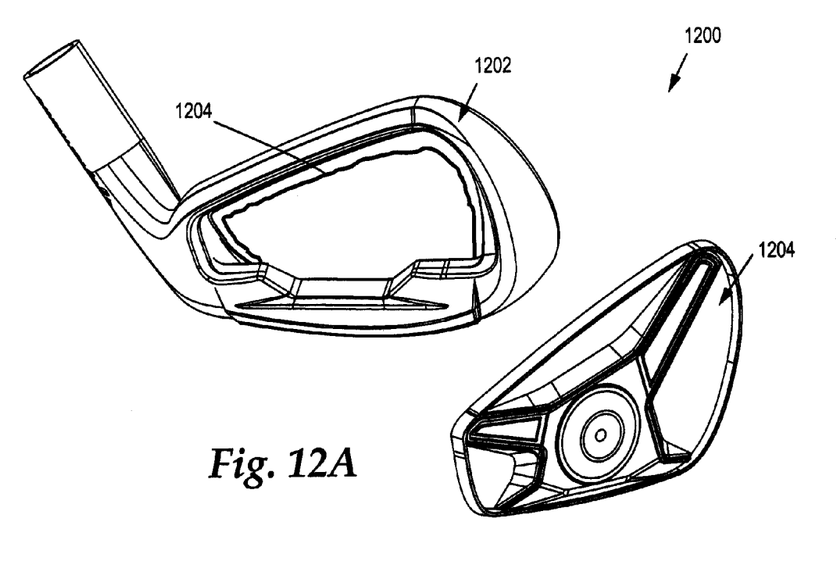
FIG. 12A is an isometric view of a golf club assembly.

FIG. 12A illustrates a cavity back golf club head 1200 including a club head portion 1202 and a badge 1204 (or third piece). The club head portion 1202 includes the entire welded club head assembly having a rear weld bead 1204, as similarly described above. The front weld bead has been removed and polished according to the operations described above. However, the rear weld bead 1204 is not removed or polished and remains exposed in the cavity and visible to a user prior to the attachment of a badge 1204. Instead of incurring addition manufacturing cost in removing the weld bead 1204, the badge 1204 is adhesively bonded to the rear surface of the striking face of the club head 1200. The badge obscures the weld bead 1204 so that no visual difference can be observed by the user. Applying the badge 1204 allows a weld to be placed on the face of the iron with minimal cost. Furthermore, the badge 1204 can have desirable effects on sound and vibration dampening upon impact with a golf ball.

Figure 12B:
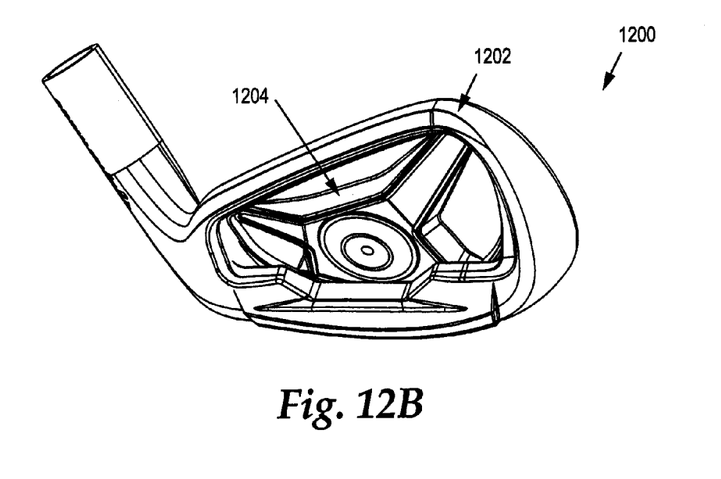
FIG. 12B is an isometric view of an assembled golf club head.

FIG. 12B illustrates an assembled view of the golf club head 1200 where the badge 1204 has been adhesively applied with epoxy or any known adhesive. For example, an epoxy such as 3M® DP460 can be used. It is possible for the badge 1204 to be mechanically attached to the club head portion 1202.

Figure 13:
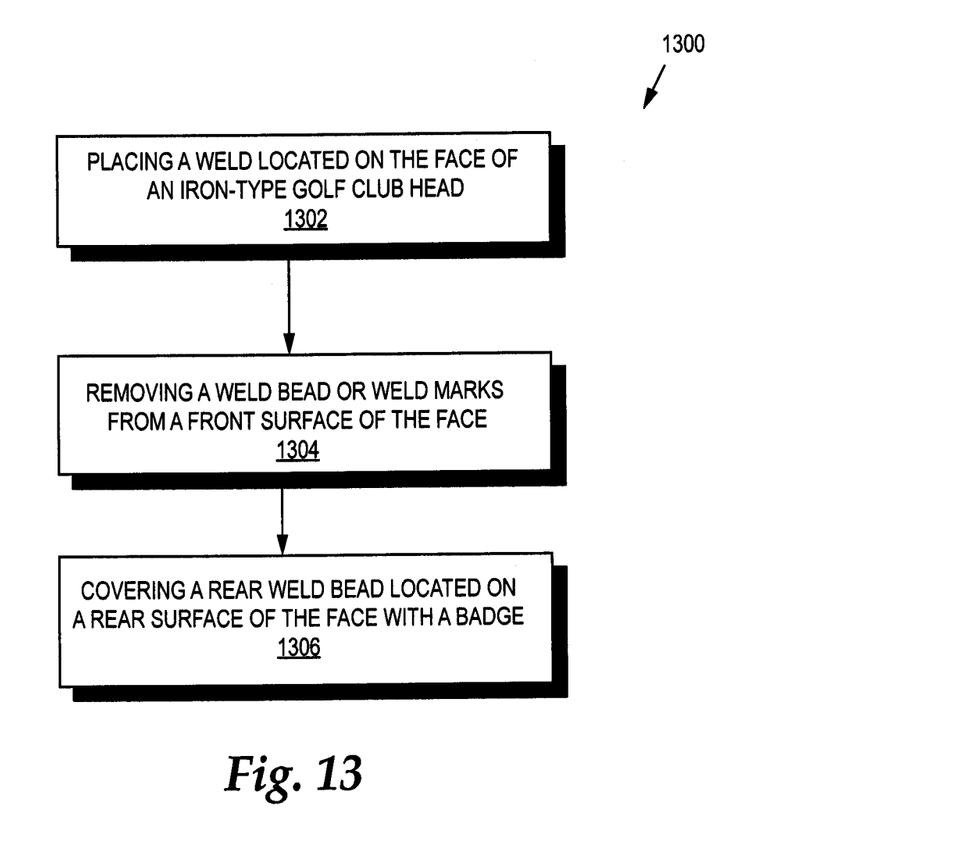
FIG. 13 is a flow chart of a golf club assembly operation.

FIG. 13 illustrates a series of operations 1300 that are accomplished in utilizing a badge to cover a rear face weld bead. Initially, a weld is placed on the face of an iron-type golf club in the first operation 1302. A weld bead likely occurs on the front face portion and within the rear cavity portion of the golf club head. The weld bead or weld marks are removed from the front face of the golf club head while allowing the rear weld bead to remain intact in a second operation 1304. Finally, the rear exposed weld that is visible in the cavity is covered by an adhesively or mechanically attached 1306 badge thereby reducing the cost of manufacturing and additional processing operations.

It is understood that the rear exposed weld can be partially covered by a badge or part of the rear piece (or second piece) so that at least a portion of the weld is visible within the cavity region. In some embodiments, 50% or more of the rear weld bead may be exposed or visible (while 50% or less is covered) in the cavity back region without departing from the scope of the present invention.

At least one advantage of the embodiments described is that dimensional uniformity is achieved in the hinge region of the golf club head. Therefore, the likelihood of a "wall blowout" or failure in the hinge region is avoided. Also, the weld is capable of being placed in a high stress location (such as on the face) due to the use of high strength materials which provide additional stability to the weld line.

At least another advantage of the embodiments described is that the weld bead being located away from the hinge region and on the face of the golf club head allows a badge to be placed in the cavity region of the club head with minimal or no manufacturing processing.

At least another advantage of the embodiments described is that a thin face and high COR golf club can be achieved by providing further dimensional stability in the hinge region.

The components of the above described components disclosed in the present specification can be formed from any of various suitable metals or metal alloys.

In addition to those noted above, some examples of metals and metal alloys that can be used to form the components of the connection assemblies include, without limitation, carbon steels (e.g., 1020 or 8620 carbon steel), stainless steels (e.g., 304 or 410 stainless steel), PH (precipitation-hardenable) alloys (e.g., 17-4, C450, or C455 alloys), titanium alloys (e.g., 3-2.5, 6-4, SP700, 15-3-3-3, 10-2-3, or other alpha/near alpha, alpha-beta, and beta/near beta titanium alloys), aluminum/aluminum alloys (e.g., 3000 series alloys, 5000 series alloys, 6000 series alloys, such as 6061-T6, and 7000 series alloys, such as 7075), magnesium alloys, copper alloys, and nickel alloys.

In view of the many possible embodiments to which the principles of the disclosed invention may be applied, it should be recognized that the illustrated embodiments are only preferred examples of the invention and should not be taken as limiting the scope of the invention. It will be evident that various modifications may be made thereto without departing from the broader spirit and scope of the invention as set forth. The specification and drawings are, accordingly, to be regarded in an illustrative sense rather than a restrictive sense.

We claim:

1. A method comprising:
    placing a continuous weld located on the face of a cavity back iron-type golf club head, the weld extending continuously on a front striking surface of the face creating a front and rear weld bead, and being located at least partially on a contact interface between a first piece and a second piece;
    removing a front weld bead from the front striking surface of the face; and
    covering the rear weld bead located on a rear surface of the face with a badge, wherein the rear weld bead is obscured by the badge in the cavity back iron-type golf club head.

2. The method of claim 1, wherein the continuous weld includes a weld centerline axis that is offset from a rear wall portion by a distance of at least 1 mm.

3. The method of claim 1, wherein the iron-type golf club head has a total face area that is between 2,700 mm$^2$-5,000 mm$^2$.

4. The method of claim 1, wherein the iron-type golf club head has a thin face area that is between 450 mm$^2$-2,020 mm$^2$.

5. The method of claim 1, wherein the iron-type golf club head has a thin face thickness that is between about 1.5-2.5 mm.

6. The method of claim 1, wherein the iron-type golf club head has a thin face thickness that is in a range of less than 2.0 mm.

7. The method of claim 1, wherein the iron-type golf club head has a thin face area percentage that is between about 13-70%.

8. The method of claim 1, wherein the iron-type golf club head has an inverted cone region that is about 230 mm$^2$ to about 2,000 mm$^2$.

9. The method of claim 1, wherein the iron-type golf club head has a first piece surface area that is about 300 mm$^2$ to about 4,000 mm$^2$.

10. The method of claim 1, wherein the iron-type golf club head has a coefficient of restitution that is greater than about 0.8.

11. The method of claim 1, wherein the first piece is forged of a steel selected from the group consisting of maraging steels, maraging stainless steels, and PH stainless steels.

12. The method of claim 11, wherein the stainless steel is C455 or 17-4 stainless steel.

13. The method of claim 1, wherein the continuous weld includes a fusion zone that occurs substantially on the face of the iron-type golf club head outside a hinge region of the club head.

14. The method of claim 13, wherein a fusion zone is substantially located in a relatively low impact stress region of the front striking surface.

* * * * *